(12) United States Patent
Thekkath

(10) Patent No.: US 6,393,500 B1
(45) Date of Patent: May 21, 2002

(54) BURST-CONFIGURABLE DATA BUS

(75) Inventor: Radhika Thekkath, Palo Alto, CA (US)

(73) Assignee: MIPS Technologies, Inc., Mountain View, CA (US)

(*) Notice: Subject to any disclaimer, the term of this patent is extended or adjusted under 35 U.S.C. 154(b) by 0 days.

(21) Appl. No.: 09/373,095

(22) Filed: Aug. 12, 1999

(51) Int. Cl.$^7$ .............................................. G06F 13/00
(52) U.S. Cl. ............................ 710/35; 710/11; 710/110
(58) Field of Search ..................... 710/11, 14, 22–28, 710/33–35, 110, 111, 307

(56) References Cited

U.S. PATENT DOCUMENTS

| | | | | |
|---|---|---|---|---|
| 4,998,198 A | * | 3/1991 | Chan ............................. | 710/32 |
| 5,255,378 A | * | 10/1993 | Crawford et al. ............. | 710/127 |
| 5,463,762 A | * | 10/1995 | Morrissey et al. ............. | 714/49 |
| 5,525,971 A | | 6/1996 | Flynn | |
| 5,579,530 A | * | 11/1996 | Solomon et al. ............... | 710/35 |
| 5,581,782 A | | 12/1996 | Sarangdhar et al. ......... | 395/800 |
| 5,615,404 A | | 3/1997 | Knoll et al. .................. | 395/882 |
| 5,696,976 A | | 12/1997 | Nizar et al. ................... | 395/739 |
| 5,751,975 A | | 5/1998 | Gillespie et al. ............. | 395/306 |
| 5,768,612 A | | 6/1998 | Nelson ......................... | 395/800 |
| 5,778,412 A | | 7/1998 | Gafken ........................... | 711/5 |
| 5,796,977 A | | 8/1998 | Sarangdhar .................. | 395/406 |
| 5,799,203 A | * | 8/1998 | Lee et al. ....................... | 710/8 |
| 5,828,865 A | | 10/1998 | Bell ............................ | 395/500 |
| 5,832,310 A | * | 11/1998 | Morrissey et al. ............. | 710/71 |
| 5,859,986 A | * | 1/1999 | Marenin ...................... | 713/401 |
| 5,892,978 A | * | 4/1999 | Munguia et al. ............... | 710/33 |
| 5,918,072 A | * | 6/1999 | Bhattacharya ................ | 710/35 |
| 6,044,225 A | * | 3/2000 | Spencer et al. .............. | 395/872 |
| 6,085,261 A | * | 7/2000 | McIntyre, Jr. et al. ......... | 710/35 |
| 6,108,734 A | * | 8/2000 | Shand .......................... | 710/105 |
| 6,122,690 A | * | 9/2000 | Nannetti et al. ............. | 710/102 |
| 6,185,637 B1 | * | 2/2001 | Strongin et al. .............. | 710/35 |

* cited by examiner

*Primary Examiner*—Christopher B. Shin
(74) *Attorney, Agent, or Firm*—Richard K. Huffman; James W. Huffman

(57) ABSTRACT

An apparatus is presented for improving the efficiency of data transactions over a computer system data bus. Bus efficiency is improved by providing a bus master with information to adjust the length and width of burst transactions over the bus to/from target devices. If a particular target device is not capable of transacting a full-length, full-width burst over the bus, then the bus master configures a burst to exploit the bursting capabilities of that particular target device. The bus master apparatus includes slave configuration logic that is configured to store a burst transaction capability corresponding to each slave device connected to the bus. The bus master apparatus also has transaction control logic. The transaction control logic is coupled to the slave configuration logic and uses the information to vary burst width and length for a transaction to a specific slave device according to the slave's burst transaction capability.

31 Claims, 9 Drawing Sheets

Burst-Configurable Bus Master

Computer System Interface Bus

*Master/Slave Device Configuration*

32-Byte Data Transfer to Slave Device 3

FIG. 7
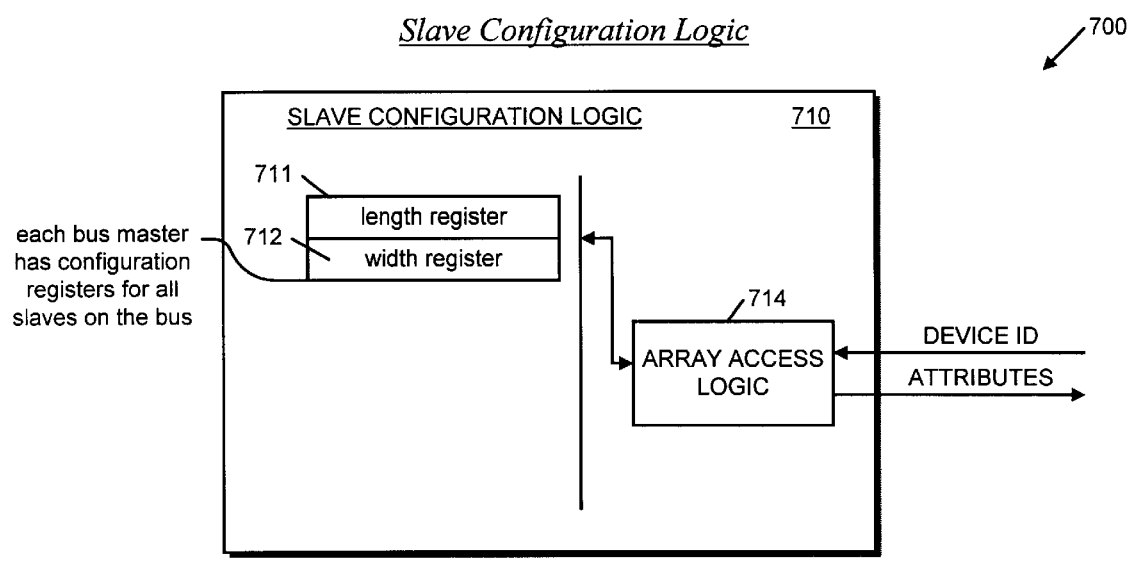
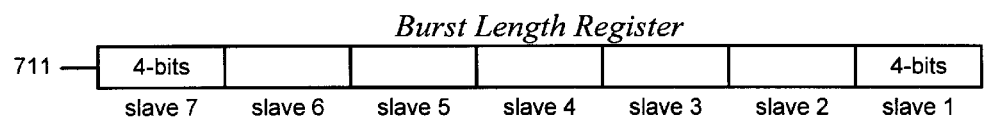
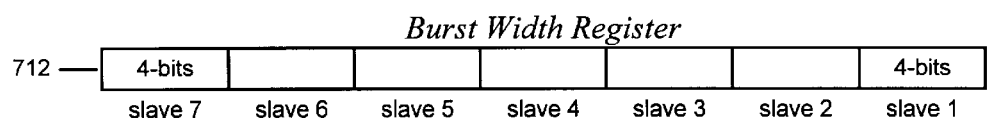

BURST-CONFIGURABLE DATA BUS

CROSS REFERENCE TO RELATED APPLICATIONS

This application is related to the following U.S. Patent applications, having a common filing date and a common assignee. Each of these applications is hereby incorporated by reference in its entirety for all purposes:

| application Ser. No. | Docket # | Title |
| --- | --- | --- |
| 09/373,091 | MIPS:19427A-007300 | SCALABLE ON-CHIP SYSTEM BUS |
| 09/373,092 | MIPS:19427A-009300 | LOCKED READ/WRITE ON SEPARATE ADDRESS/DATA BUS USING WRITE BARRIER |
| 09/373,094 | MIPS:19427A-009400 | COHERENT DATA APPARATUS FOR AN ON-CHIP SPLIT TRANSACTION SYSTEM BUS |
| 09/373,093 | MIPS:19427A-009500 | DATA RELEASE TO REDUCE LATENCY IN ON-CHIP SYSTEM BUS |

BACKGROUND OF THE INVENTION

1. Field of the Invention

This invention relates in general to the field of computer system bus architectures, and more particularly to an apparatus in a bus master device for configuring the cycles in a data transfer burst to match the attributes of an addressed slave device.

2. Description of the Related Art

Computer systems have historically consisted of a number of distinct components such as a central processing unit (CPU), a memory, and input/output (I/O) logic. The CPU performs all of the computational functions, the memory stores program instructions and data that direct the CPU to perform specific functions, and the I/O logic provides an interface to devices such as video monitors, keyboards, and storage devices. The CPU must constantly transfer data to/from the memory to retrieve program instructions and to store results of computations. The CPU must also communicate with the I/O logic to retrieve commands and to display results. In many systems today, the I/O logic directly retrieves large blocks of data from the memory to allow video monitors to be refreshed without burdening the CPU.

Because the data communicated between devices in a computer system are of the same format and syntax, it is standard practice to interconnect all of the devices in a bused architecture rather than providing point-to-point connections between devices. In a bused architecture, a common set of communication signals-an address/data bus-are connected in parallel to all devices. The address signals on the address/data bus, or system bus, are used to identify a device that is the target of a data transfer. The data signals on the address/data bus are used to transfer the data to the target device. In some system configurations, the address signals and the data signals are separated, that is, separate address and data buses. In other system configurations, the address and data signals are multiplexed over the same bus by using other control signals to indicate whether an address is present on the bus or whether data are present.

Because each device in the system configuration are connected in parallel to the address/data bus, it follows then that only one instance of a data transfer can occur at any given point in time. If two devices were to execute a data transfer at the same time, then signals on the bus would be corrupted, thus precluding any transfer of data. Fortunately, system designers prescribe a set of communication rules for the bus, or bus protocol, that bars devices from transferring data at the same time. Each device connected to the bus is required to strictly adhere to the bus protocol so that simultaneous access to the bus is avoided. What this means in the integrated circuit world is that the components in a computer system are purposely designed to comply with a specific bus protocol, or perhaps to increase marketability, with a fixed set of bus protocols.

In early years, computer system buses were small, eight bits wide, the CPU was the only device that was capable of initiating a data transfer, and the number of other devices connected to the bus consisted primarily of memory and I/O logic. Accordingly, the bus protocol for such a system was very straightforward: If the CPU required a byte of data from the memory, it grabbed the bus, issued the address of the data byte to the memory, and the memory supplied the byte of data to the CPU. If more than one data byte were required, then the CPU would repeat the above process until the required number of bytes were retrieved from the memory.

But the advent of the digital computer, along with a host of associated technological advances, have completely changed the course of society over the past 20 years. Because a digital computer can be used to control a wide range of automated processes, whole industries have migrated toward the incorporation of computers into their products. Today we see computer systems in telecommunication devices, televisions, home appliances, automobiles, industrial process controllers, musical instruments, games, and vending machines, not to mention aircraft, spacecraft, weapons systems, and data network servers. It could be said now that it is the demand for faster, more precise, more application-specific, more robust computer systems that is driving the computer industry toward further advances instead of advances in the industry identifying opportunities for application of computer devices. We are experiencing an era where demands are pulling enabling technologies along.

Today, there are literally thousands of different devices that can be connected to a computer bus. And today's data buses are no longer 8 bits wide; 64-bit buses are more commonly found with new devices coming to the field having buses with widths of 128 bits or more. In addition, today's systems no longer consist of only one device that is capable of initiating a transaction over the data bus. A high-end performance computer may have a CPU that is dedicated to performing general purpose computations, a graphics processor that performs video-intensive computations, and a digital signal processor (DSP) that performs intensive audio signal manipulations. The high-end system may also have a communications processor that is dedicated to interacting with other computers over a network. And all of these processors must communicate over a bus to memory, to I/O logic, and to innumerable other kinds of special-purpose devices. In fact, it is not uncommon today to find four or more CPUs in a system configuration, each of which is capable of initiating bus transactions. Moreover, all of these elements of the computer system, to include the system bus itself, may be fabricated as part of a single integrated circuit device.

As devices have become more diverse, more complex, and more capable, the rules for communication between devices has also evolved. Bus protocols today account for the fact that multiple devices can initiate data transfers. In fact, many present day CPUs have on-chip bus arbitration logic that enables them to interact over a shared data bus with other like CPUs. The arbitration logic grants bus access to requesting devices according to some predefined algorithm so that all devices on the bus can effect their required data transactions in a timely manner. When a device requests access to the bus, the arbitration logic may either grant or refuse access, so that contention between devices is avoided. Typically following a grant, the requesting device conducts its transaction and then relinquishes the bus so that other devices can conduct transactions. So devices must request access to the bus, they must wait for access to be granted by the arbitration logic, then they are allowed to conduct their data transaction over the bus.

Request, grant, transfer. Request, grant, transfer. One can observe that two-thirds of the bus protocol steps are devoted to performing overhead functions, that is, functions that do not transfer data. And system designers recognize that tying up a shared medium to perform functions outside of the primary intent of the medium is disadvantageous to all the devices that share the medium. This observation has resulted in the development of a technique in the art to drastically improve the efficiency of data transactions over a bus commonly referred to as a burst transaction.

A burst transaction is distinguished from a single transaction in that, rather than transferring data over the bus for one clock e following reception of a grant, a device capable of a burst transaction is allowed to transfer data for multiple clock cycles before it must relinquish the bus. For example, the Pentium II® bus is a 64-bit data bus that allows 32-bytes of data to be transferred in a burst transaction consisting of four back-to-back cycles, each cycle transferring eight bytes of data. Hence, rather than exhibiting request, grant, transfer, a device capable of bursting over the Pentium II® system bus exhibits request, grant, transfer, transfer, transfer, transfer-a two-fold increase in bus efficiency over previous devices.

The burst technique is essential to the continued development of more complex, more advanced computer systems. But the present inventors have observed that present day devices that initiate burst transactions, commonly referred to as bus masters, are deficient. That is because they are inflexible: they can execute a burst transaction only having a fixed number of cycles to a device that is compatible with the full-width of the bus or else single-cycle transactions are required. For example, a 64-bit 4-cycle burst bus master is only capable of executing a 4-cycle burst to another 64-bit device. If the target device is not capable of bursting for 4 cycles or if it is, say, a 32-bit device, then the bus master cannot conduct a burst transaction with the target device. As a result, single-cycle transactions are required, thus decreasing bus efficiency.

If all of the devices that are connected to a bus are capable of accepting burst transactions at the width and length provided by the bus masters, then only other application-specific factors tend to influence the efficiency of the bus. But real-world systems are not so pure. Perhaps, in order to stay competitive, a manufacturer must produce a system that uses a less-than-capable device, say a 32-bit DSP capable of 4-cycle bursts, in a 64-bit system configuration that has fixed 4-cycle burst transactions. Or suppose that some military requirement demands immediate fielding of a system but requires use of a low-end performance device that is 64-bits wide, but only capable of 2-cycle bursts rather than, say, 4-cycle bursts. In both cases, utilizing legacy devices and utilizing low-end devices in a system, the performance of the system is adversely affected because transactions with these devices are relegated to single-cycle transactions. Computer systems employing legacy devices and low-end devices constitute a significant number of the systems produced today, and to cut system costs and meet time-to-market goals, the tendency in the art is toward increasing usage of such devices in state-of-the-art bus architectures.

One example of an interface bus designed to support legacy devices is PCI. The PCI bus has the capacity to support devices of differing bus widths (16-bit and 32-bit, for example). However, for each transfer, the bus master is required to ping the slave to determine its capability. Once determined, the master can communicate with the slave according to its capability. However, such communication is restricted to single reads/writes, rather than burst transactions. And, the added overhead to determine a slave devices capability is undesirable.

Therefore, what is needed is a bus master that can adjust the number of cycles (the length) in a burst transaction to accommodate a transaction to a target slave device in accordance with the capabilities of that device.

In addition, what is needed is an apparatus in a bus master that optimizes a burst transaction to a slave device over an on-chip data bus by minimizing the number of transaction overhead cycles.

Furthermore, what is needed is a bus master apparatus that stores the capabilities of target slave devices on the bus, the capabilities being used to configure device-specific burst transactions.

Moreover, what is needed is a bus master that can exploit the bursting capabilities inherent within legacy and low-end performance devices.

SUMMARY

The present invention provides a novel technique for improving the efficiency of data transactions over a system bus. Bus transaction time is minimized by tailoring burst sequences to match the bursting capabilities of target slave devices.

In one embodiment of the present invention a bus master for controlling transactions to a slave device over a data bus includes slave configuration logic and transaction control logic. The slave configuration logic stores a burst transaction capability corresponding to the slave device. The transaction control logic is coupled to the slave configuration logic and varies burst width according to said burst transaction capability. The capability to vary burst width allows a system designer to incorporate a legacy device into a system configuration without radically compromising efficiency of the data bus.

One aspect of the present invention provides a bus master apparatus for controlling data transactions to a slave device. The bus master apparatus has a data bus, slave configuration logic, and transaction control logic. The data bus provides a medium for affecting a transaction between a bus master device and the slave device, where the bus master device and the data bus are incorporated into a single integrated circuit. The slave configuration logic is coupled within the single integrated circuit to the data bus. The slave configuration logic stores a burst transaction capability corresponding to the slave device. The transaction control logic is coupled within the single integrated circuit to the slave configuration logic. The transaction control logic varies burst width according to the burst transaction capability. By configuring bursts sequences in accordance with the slave device's ability to accept bursts that are less than the full width of the data bus, transactions to the slave device occur faster and competing devices on the data bus experience fewer delays.

Another aspect of the present invention has an apparatus within a bus interface for controlling a data transfer to/from a slave device over a data bus. The apparatus includes transaction configuration logic and transaction control logic. The transaction configuration logic provides a transaction capability for the slave device to the bus interface. The transaction configuration logic has a configuration register and access logic. The configuration register stores the transaction capability for the slave device. The access logic is coupled to the configuration register and retrieves the transaction capability from the configuration register. The transaction control logic is coupled to the transaction configuration logic and configures the data transfer to the slave device according to the transaction capability by adjusting the number of data bits transferred per cycle. Adjusting the number of data bits transferred per cycle results in the elimination of unnecessary bus requests over the bus to communicate with a legacy device.

In another aspect, the present invention provides a computer program product for use in designing, simulating, fabricating, or testing an integrated bus master device. The computer program product has a storage medium that has computer readable instructions embodied thereon, for causing a computer upon which the computer readable instructions are executed to describe the integrated bus master device such that it can be modified, simulated, fabricated, or tested. The computer readable instructions include first instructions and second instructions. The first instructions cause the computer to describe a plurality of slave configuration registers within the integrated bus master device, where each of the plurality of slave configuration registers stores a transaction capability for a corresponding slave device connected to a data bus. The second instructions cause the computer to describe transaction control logic, where, for a data transfer to a given slave device, the transaction control logic configures data bits/cycle in accordance with a given transaction capability retrieved from a given slave configuration register.

BRIEF DESCRIPTION OF THE DRAWINGS

These and other objects, features, and advantages of the present invention will become better understood with regard to the following description, and accompanying drawings where:

FIG. 7 is a block diagram of slave configuration logic within a bus master according to the present invention.

DETAILED DESCRIPTION

In light of the above background on techniques for transferring data over a computer system interface bus, several examples will now be discussed with reference to FIGS. 1 through 5. These examples exemplify the problems associated with present day computer system interface buses, in particular when data is transferred to/from legacy devices or low-end performance devices. Following this discussion, a detailed description of the present invention will be provided with reference to FIGS. 6 through 9. The present invention provides an apparatus that allows a burst data transaction to be optimized according to target device capabilities for efficient transfer over a data bus.

Figure 1:
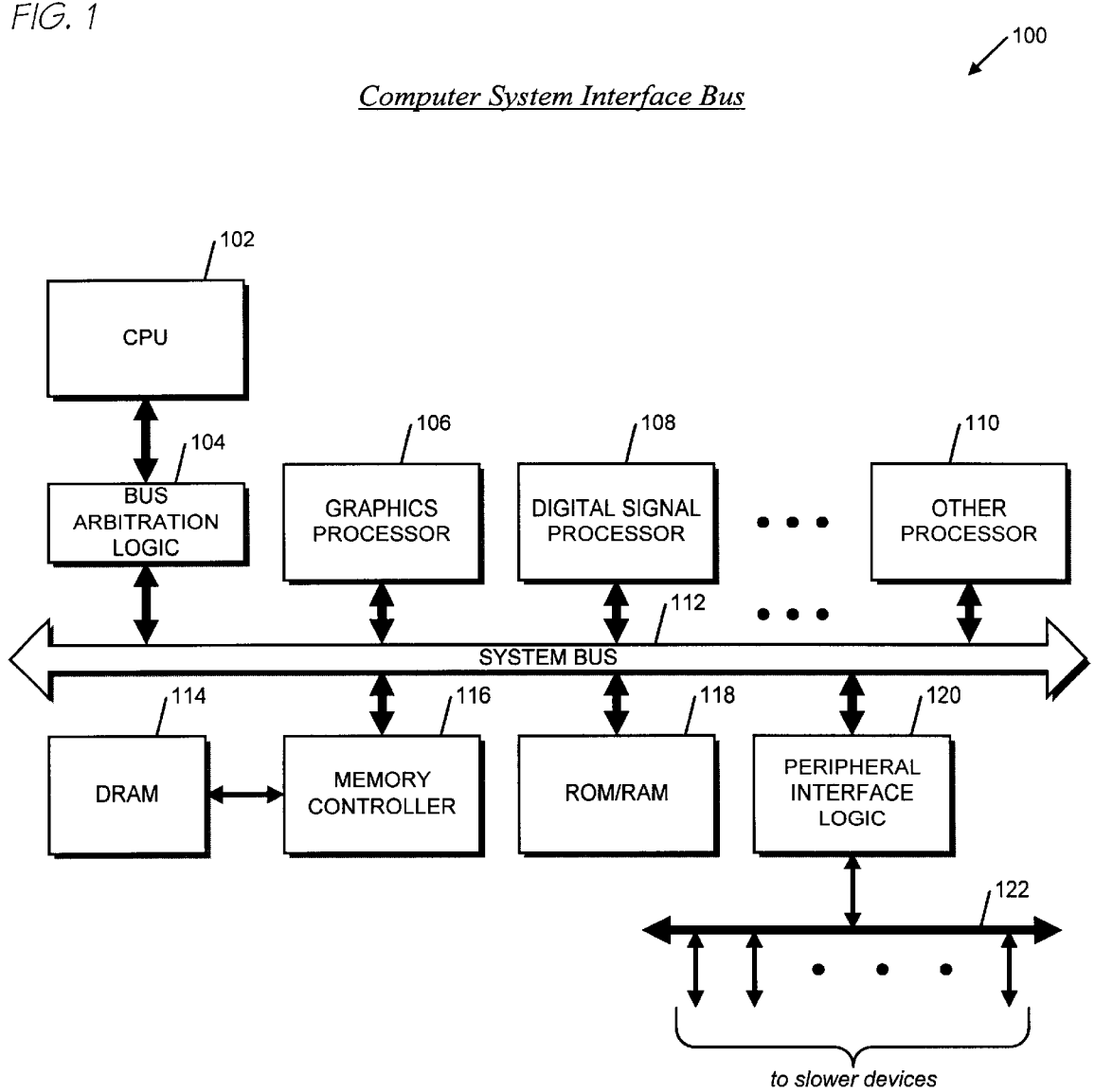
FIG. 1 is a block diagram illustrating a computer system interface bus providing an interface for transferring data between typical computer system devices.

Referring to FIG. 1, a block diagram 100 is presented illustrating an interface bus 112 that provides a medium for transferring data between typical computer system devices. The block diagram 100 shows a central processing unit (CPU) 102 connected to the system bus 112 through bus arbitration logic 104 Also connected to the system bus 112 are a graphics processor 106, a digital signal processor (DSP) 108, and some number of other processors 110 In addition, a memory controller 116 is present on the bus 112. Devices on the bus 112 access dynamic random access memory (DRAM) 114 through the memory controller 116 Also, auxiliary memory 118 such as read-only memory (ROM) or random access memory (RAM) resides on the bus 112. Furthermore, peripheral interface logic 120 provides a gateway between devices on the system bus 112 and slower devices that are connected to a slower, peripheral interface bus 122.

The devices interconnected via the system bus 112 of FIG. 1 are representative of an average present day computer system. Operationally, the system bus 112 is the principal medium for transferring data between devices. The CPU 102 is the heart of the computer system and performs most of the system's general purpose computations. The graphics processor 106 and DSP 108 are representative of devices present in a high-end performance system and respectively perform dedicated graphics processing and DSP tasks. And other processors 110 are included, based upon the system's application, to perform other dedicated processing tasks. Common dedicated processing tasks include fault monitoring and reporting, operator interface control, and application-specific communications.

The CPU 102, graphics processor 106, DSP 108, and other processors 110 routinely initiate data transfer transactions over the bus 112 to access DRAM 114, auxiliary memory 118, slower devices via the peripheral interface logic 120, or to access each others' data. For example, the CPU 102 may initiate a data transaction to send data to the graphics processor 106. Alternatively, the DSP 108 may initiate a transaction with the memory controller 116 to read a block of data from DRAM 114. And because more than one device can initiate a transaction on the bus 112 it is possible for two or more devices to contend for bus resources by initiating a transaction at the same point in time. Consequently, arbitration logic 104 is incorporated into the system architecture to preclude bus contentions and to provide fair and timely access to the bus 112 for all initiating devices.

Although the arbitration logic 104 may be embodied as a separate component on the bus 112, one more often finds the bus arbitration logic 104 incorporated into the same integrated circuit as the CPU 102, as is alluded to in FIG. 1. The arbitration logic 104 manages transaction requests from initiating devices according to a prescribed algorithm. In some system configurations, a priority is assigned to each device and access to the bus 112 is granted by the arbitration logic 104 to the requesting device having the highest priority. In other configurations, each device is assigned an identifier rather than a priority and the bus arbitrator 104 grants access requests by employing an equal-priority scheme such as round robin. By treating each requestor with equal priority, the round robin scheme attempts to provide fair access to the bus 112 for all initiating devices. An in-depth discussion of bus arbitration schemes is beyond the scope of this application. At this point it is sufficient to note that 1) a present day computer system bus 112 may include a number of devices 102, 106, 108, 110 that are each capable of initiating data transactions; and 2) bus arbitration logic 104 is required to regulate traffic flow over the bus 112. Generally speaking, an initiating device issues a request to the bus arbitration logic 104 for a transaction. According to its arbitration algorithm, the bus arbitrator 104 either refuses the request or grants the request. If the request is granted, then the initiating device completes the transaction according to the bus protocol.

Devices connected to the bus that are capable of initiating a transaction are commonly referred to as master devices or bus masters. Devices capable only of responding to an initiated transaction are referred to as slave devices or bus slaves. Most present day CPUs 102 provide bus mastering capabilities, and possibly slave capabilities (for cache coherency operations), however, the remaining processors 106–110, the memory controller 116, and the peripheral interface logic 120 can fall into either category. The auxiliary memory 118 is virtually always a slave device on the bus 112. In order to more precisely discuss the interaction between master devices and slave devices on a system bus, FIG. 2 is provided.

Figure 2:
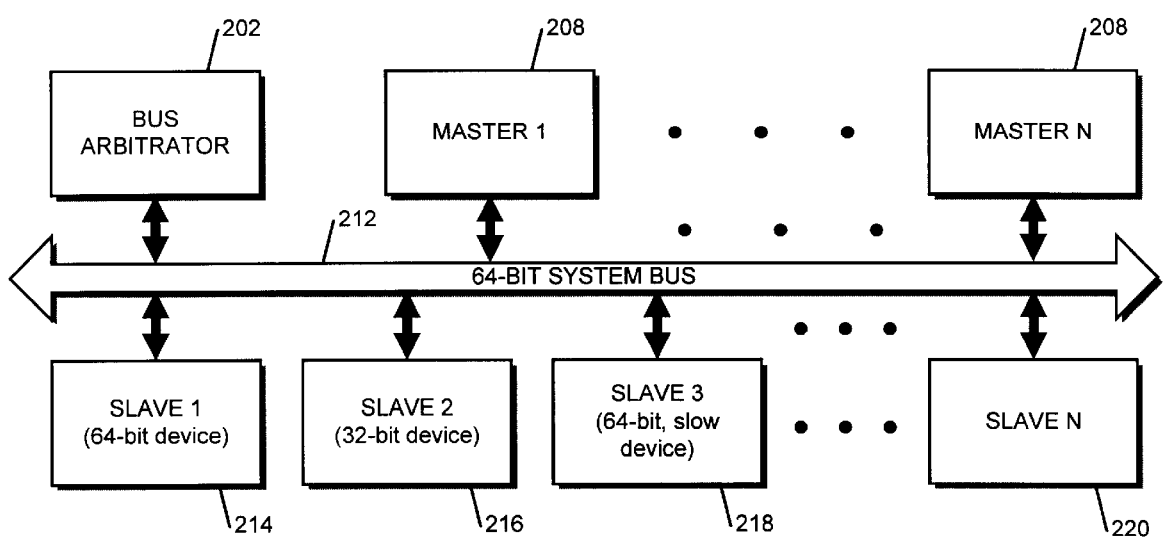
FIG. 2 is a block diagram of a 64-bit computer system interface bus featuring interconnected bus master devices, bus slave devices, and a bus arbitrator.

Referring to FIG. 2, a block diagram 200 of a 64-bit computer system interface bus 212 is presented featuring N interconnected bus master devices 208, N bus slave devices 214–220, and a bus arbitrator 202. Each of the master devices 208 is capable of initiating a data transaction over the bus 212 by sending a request to the bus arbitrator 202. The bus arbitrator 202 controls traffic flow on the bus 212 by granting a particular bus master 208 access to the bus 212 according to an arbitration algorithm. A particular bus master 208 can read/write data from/to any of the slave devices 214–220 or to any of the other bus master devices 208.

Architecturally, specifications for the system bus 212 support efficient data transfer between a maximum number of master devices 208, N, and slave devices 214–220, N. Representative specifications include transfer rate, typically prescribed in megabits per second; bus width, typically prescribed in number of bits transferred per clock cycle; address/data bus configuration, typically having either separate address and data buses or a multiplexed address/data bus; and a number of other detailed attributes to include arbitration scheme and request/grant protocol. Although the specific address/data bus configuration and transfer rate are not provided for the system configuration shown in FIG. 2, the bus width is specified: 64-bits. A 64-bit data bus is capable of transferring 64-bits (i.e., referred to herein as a quadword) of data in a single clock cycle. As alluded to with reference to FIG. 1, the bus arbitrator 202 shown in FIG. 2 can be part of any or all of the master devices 208. In fact, one skilled in the art will appreciate that several master devices 208, several slave devices 214–220, the bus arbitrator 202, and even the bus 212 itself could be combined into a single integrated circuit device. More specifically, a given system configuration might consist of MASTER 1 208, the bus arbitrator 202, the system bus 212, and SLAVE 1 214 on a single integrated circuit. The blocks shown in FIG. 2 are intended only to illustrate architectural distinctions, not physical barriers between integrated circuits.

Early computer systems had 8-bit bus widths, only one bus master 208 (the CPU), and transfer rates on the order of kilobits per second. In contrast, present day computer systems can have several bus masters 208, multiple-byte bus widths, and transfer rates on the order of gigabits per second. This architectural evolution has been driven by several factors, perhaps the most significant being the proliferation of computer systems into nearly every aspect of society. As such, application demands have resulted in requirements for faster devices, special-purpose devices such as DSPs, and devices that operate on large amounts of data such as graphics processors. Computer systems are found in airplanes, cars, appliances, network servers, industrial controls, automated teller machines, video games and entertainment systems, cellular telephones, garage door openers, and most prevalently, the ubiquitous desktop computer. In general, it is the most stringent application requirements that drive the specifications for a system bus 212. And most often one finds that a bus 212 is specified to support the operation of a given CPU; the remaining devices on the bus 212 are thus derivatively compelled to be compatible with the specified bus characteristics.

That the remaining devices on the data bus 212 must conform to certain bus characteristics has always been a problem for system designers, frequently because application demands and time-to-market considerations tend to override concerns for architectural consistency. More specifically, rather than waiting for the development of devices-master devices 208 or slave devices 214–220 to catch up with the capabilities of a given CPU 208 and its corresponding system bus 212, system designers have historically provided work-around system solutions that enable the use of older, less-capable devices, commonly referred to as legacy devices. In doing so, computer system products reach the marketplace faster, albeit with less than architecturally optimum devices other than the CPU itself.

Direct memory access (DMA) is one example of a work-around technique that has become a fixture in many present day computer systems. DMA is employed to allow data transactions between system memory and slower peripheral devices such as floppy disks and hard disks. Rather than having a master CPU 208 read a block of data from memory and then write the block of data to a peripheral device, a dedicated DMA channel is provided between the memory and the peripheral device. Once the channel is assigned, the data transaction takes place asynchronously to any other CPU activity. Usually the CPU 208 is notified when the transaction is completed. DMA is just one example of the techniques used in the art that allow legacy devices to be used in a system configuration that supports more advanced data transactions.

But even though conventional DRAM is much faster than a floppy disk, DRAM is in fact much slower than the capabilities of most CPUs. And to provide for the use of DRAM in present day computer systems, system designers have turned to the widespread use of on-chip memory caches. Because it has been observed that both instructions and data objects of an application program have temporal and spatial locality in memory, designers have provided these on-chip blocks of high-speed memory to store a small portion of the application program and its associated data. The CPU accesses instructions or data from this high-speed memory cache rather than performing a transaction over the bus 212 each time that an instruction or data is needed. And when a cache/memory transaction over the bus 212 is required, rather than transferring each byte of data in a sequence of single-cycle bus transactions, an accelerated protocol-a burst transaction-has been developed that allows blocks of data to be transferred to/from the on-chip cache without incurring the overhead clock cycles that would otherwise result. Burst transactions, like DMA, are merely another work-around technique provided so that devices with very fast cache memories can interact with slower, and less expensive, DRAM devices in a computer system configuration. And since memory caches abound in master devices 208, the use of burst techniques to execute data transactions over a system bus 212 has become yet another de facto standard for computer system designers. Rather than increasing the width of a data bus 212 to, say 512 bits, it is more effective to transfer data to a cache in a master device 208 over the bus 212 in a burst transaction consisting of, say, eight transfer cycles, each cycle transferring a quadword of data.

With regard to burst transaction capability, most devices-master devices 208 and slave devices 214–220 fall into one of two categories: either they are capable of supporting a burst transaction or they are not capable. Consequently, a present day data bus 212 only provides the capability to execute either a full-width burst transaction or a single-cycle transaction comprising less than a full-width transfer of data; no capability exists for optimizing a transaction according to target device capabilities. For example, suppose that the 64-bit system bus 212 of FIG. 2 supports a 32-byte burst transaction. The 32-byte burst transaction would thus require four clock cycles to complete, with each cycle transferring eight bytes of data. Consequently, any device on the bus 212 that is not capable of 4-cycle 32-byte transactions would be relegated to a series of single-cycle transactions rather than a burst.

Figure 3:
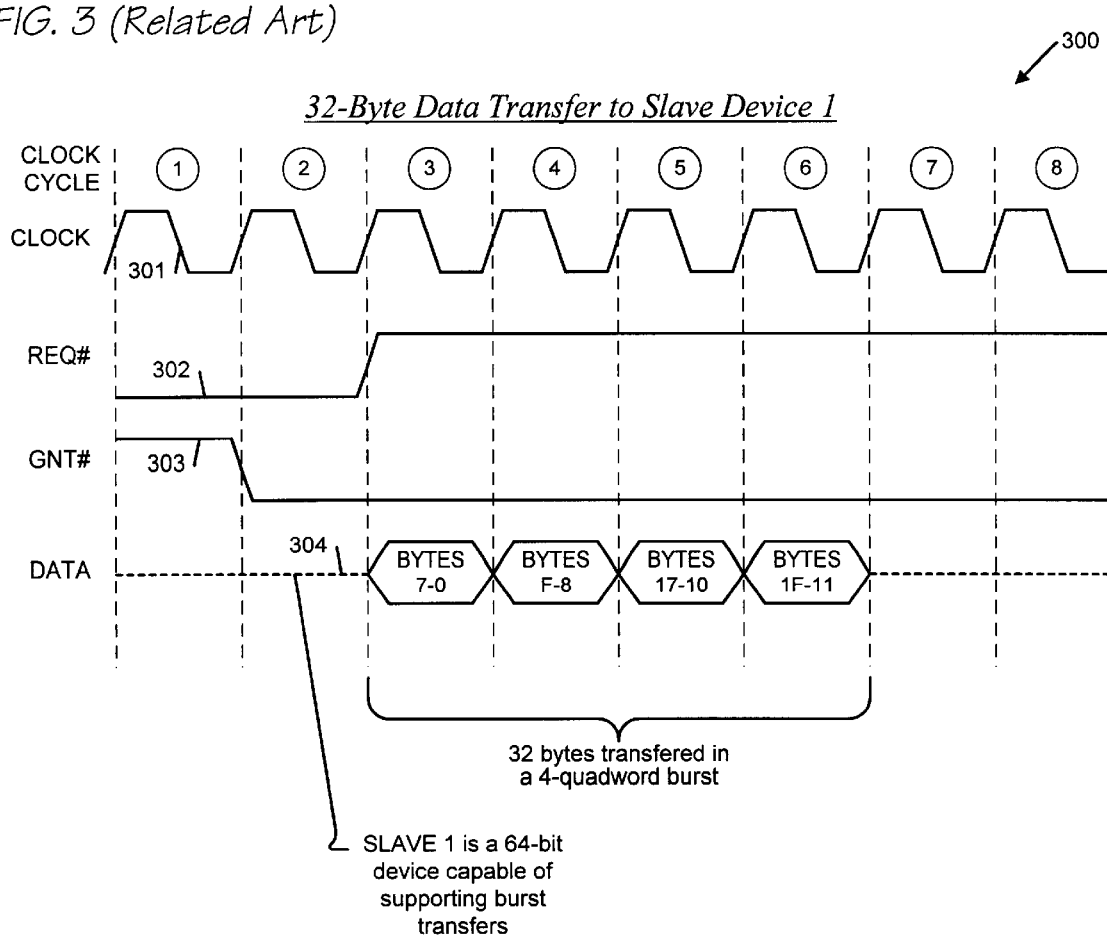
FIG. 3 is a timing diagram illustrating a 32-byte data transfer to SLAVE DEVICE 1 over the 64-bit bus of FIG. 2.
Figure 4:
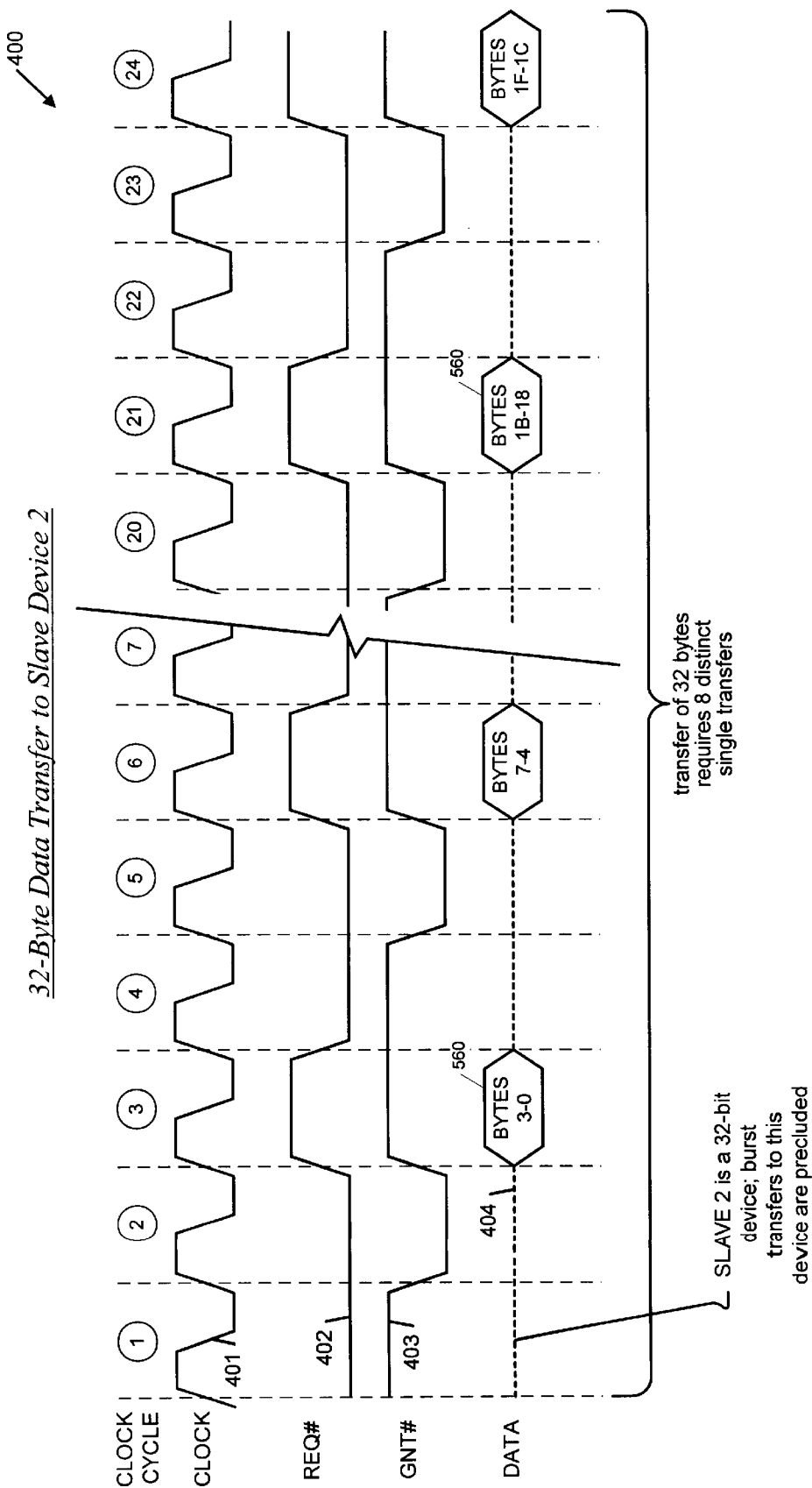
FIG. 4 is a timing diagram illustrating a 32-byte data transfer to SLAVE DEVICE 2 over the 64-bit bus of FIG. 2.
Figure 5:
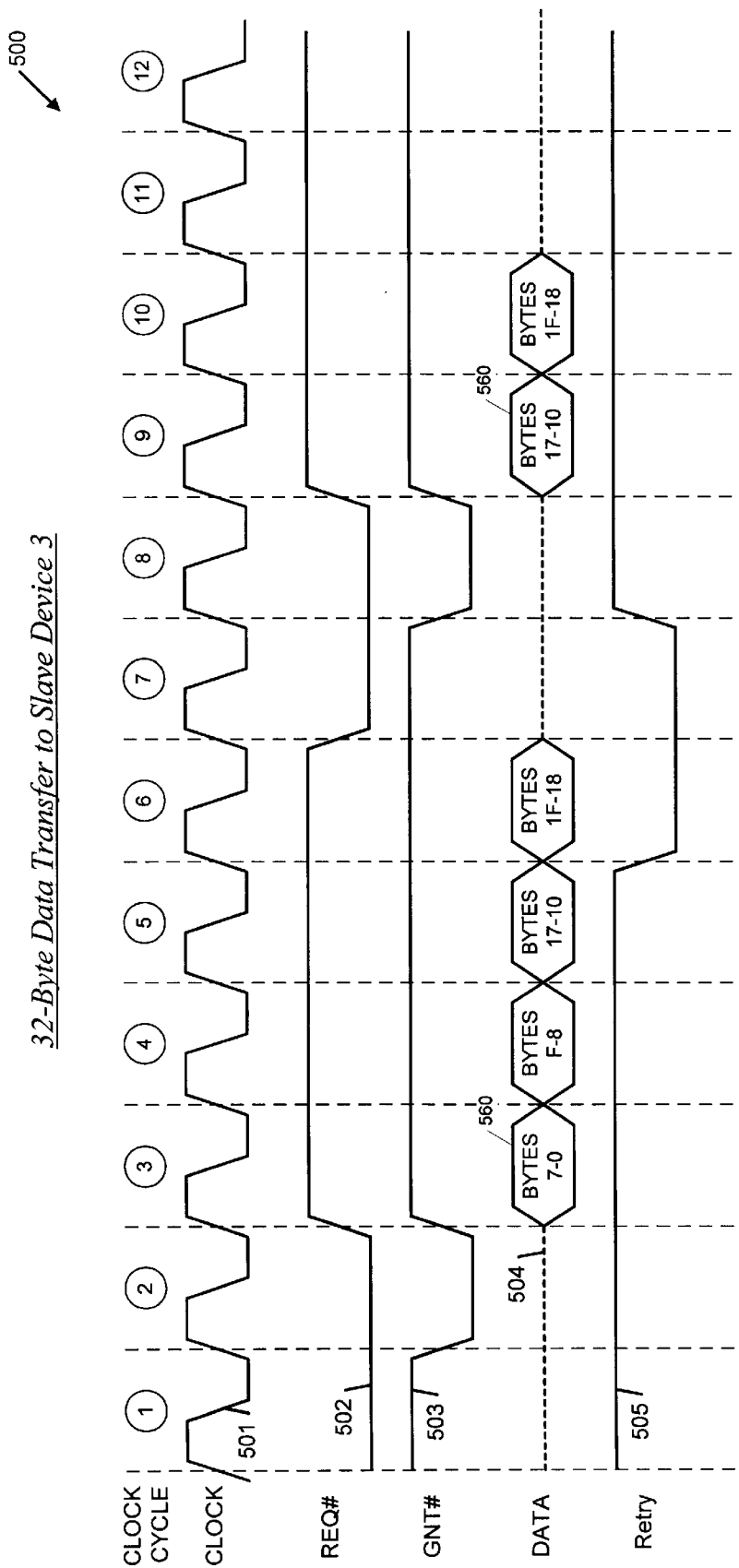
FIG. 5 is a timing diagram illustrating a 32-byte data transfer to SLAVE DEVICE 3 over the 64-bit bus of FIG. 2.

Relegation of the transactions for a given device from burst to single-cycle not only adversely impacts communication with that given device, but in addition promulgates negative effects to all the other devices on the bus 212. This is because all devices on the bus 212 must share the bus 212 to communicate data. As with any other type of shared communication medium, when one device connected to the medium exhibits delays, all the remaining devices suffer. To further elaborate this point, FIGS. 3 through 5 are provided to illustrate transactions over the bus 212 with three characteristic slave devices 214–218, respectively SLAVE 1 214, SLAVE 1 216, and SLAVE 3 218. SLAVE 1 214 is a device capable of supporting burst transactions at the full width of the bus 212, i.e., a 4-cycle burst of 64-bits per cycle. SLAVE 2 216 is a legacy device, a 32-bit device in this instance, that cannot support full-width burst transactions. SLAVE 3 218 is a full-width 64-bit device, however, it is not capable of supporting 4-cycle bursts.

Referring to FIG. 3, a timing diagram 300 is presented illustrating a 32-byte data transfer to SLAVE DEVICE 1 214 over the 64-bit bus 212 of FIG. 2. The timing diagram 300 shows relative states during the 32-byte data transfer of a bus clock signal 301, CLOCK; a bus request signal 302, REQ#; a bus grant signal 303, GNT#; and 64 data bit signals 304, DATA. SLAVE 1 214 is a device that supports full-width burst-mode transactions. SLAVE 1 214 can represent any number of devices in a present day computer system that are closely coupled to the CPU, such as an on-chip cache memory. For the purposes of this discussion, the address/data bus configuration (i.e., separate address/data buses or multiplexed address/data bus) and arbitration scheme, and are irrelevant. In fact, one skilled in the art will appreciate that REQ# 302 and GNT# 303 can as well be embodied as messages over a data bus rather than discrete signals. What is germane is that to execute a transaction with SLAVE 1 214, a bus master 208 must first request the bus 212 by initiating a request, REQ# 302, to the bus arbitrator 202. Some number of cycles thereafter-one cycle as shown in FIG. 3-the bus arbitrator 202 grants the bus 212 for the 32-byte transaction by issuing GNT#, 303. Following the grant, the transaction transpires. The relative signal states 301–304 for the 32-byte transaction are shown with respect to cycles of CLOCK 301.

During cycle 1, REQ# 302 is asserted by a bus master 208 requesting the 32-byte burst transaction with SLAVE 1 214. Whether the transaction is a read or a write is immaterial.

During cycle 2, the bus arbitrator 202 grants the bus 212 to the bus master 208 for the burst transaction by asserting GNT# 303. That GNT# 303 is issued exactly one cycle after REQ# 302 is asserted is also unimportant. One skilled in the art will appreciate that a one-cycle delay is representative of present day arbitration techniques.

During cycle 3, the bus master 208 transfers 64-bits of data, bytes 7-0, over DATA 304 to SLAVE 1 214.

During cycle 4, because a burst transaction has been granted, the bus master 208 transfers another 64-bits, bytes F-8, of data over DATA 304 to SLAVE 1 214.

During cycle 5, the bus master 208 transfers bytes 17-10 over DATA 304 to SLAVE 1 214.

During cycle 6, the bus master 208 transfers bytes 1F-11 over DATA 304 to SLAVE 1 214. At this point the 32-byte burst transaction is complete.

One skilled in the art will observe that, in addition to the four clock cycles used to transfer the 32-bytes of data, two additional clock cycles are required to initiate the transaction: a first cycle to request the transaction and a second cycle to grant the transaction. These two cycles are commonly referred to as transaction overhead cycles because, although they are required to initiate the transaction, no data are transferred therein. Additionally, one skilled in the art will acknowledge that, based upon the specific bus architecture and arbitration protocol employed by a designer, the resulting overhead for a transaction over a corresponding system bus can indeed be many clock cycles in length. Therefore, it follows that burst transactions are effective because they allow multiple-cycle data transfers to take place while only incurring the transaction overhead associated with a single-cycle transaction.

Now referring to FIG. 4, a timing diagram 400 is presented illustrating a 32-byte data transfer to SLAVE DEVICE 2 216 over the 64-bit bus 212 of FIG. 2. The timing diagram 400 shows relative states during the 32-byte data transfer of a bus clock signal 401, CLOCK; a bus request signal 402, REQ#; a bus grant signal 403, GNT#; and 64 data bit signals 404, DATA. SLAVE 2 216 is a 32-bit device that does not support full-width transactions. Whether or not SLAVE 2 216 can support multiple-cycle transactions is irrelevant because a present day bus master 208 can only transfer the data via single-cycle transactions rather than bursting. In a present day system, SLAVE 2 216 is representative of a legacy 32-bit device that is employed in order to accelerate development of a product. In a legacy computer system, SLAVE 2 216 may have been capable of supporting 4-cycle bursts, but only for 32-bit bus widths. Consequently, when employed in the present day bus 212, data transfers to/from SLAVE 2 216 must be conducted on a single-cycle basis. The relative signal states 401–404 for the 32-byte transaction are shown with respect to cycles of CLOCK 401.

During cycle 1, REQ# 402 is asserted by a bus master 208 requesting a single-cycle transaction with SLAVE 2 216 to transfer 32-bits of data, i.e., the first four bytes of the 32-byte transfer.

During cycle 2, the bus arbitrator 202 grants the bus 212 to the bus master 208 for the single-cycle transaction by asserting GNT# 403.

During cycle 3, the bus master 208 and SLAVE 2 216 transfer 32-bits of data, bytes 3-0, over DATA 404. At this point, the first of eight single-cycle transactions is completed. Eight single-cycle transactions are required to transfer the entire 32-bytes of data because only four bytes are transferred during each single-cycle transaction.

During cycles 4 through 6, another single-cycle transaction occurs to transfer bytes 7-4 of the 32-byte transaction.

The last four bytes of the 32-byte transaction, bytes 1F–1C, are finally transferred by the single-cycle transfer occurring during clock cycles 22–24. At this point the 32-byte transfer to/from SLAVE 2 216 is completed.

Because single-cycle transactions are required to transfer data to/from the SLAVE 2 device 216, 24 clock cycles on the bus 212 are consumed, with two-thirds of the clock cycles being dedicated to overhead tasks; data are transferred only during eight of the clock cycles. One skilled in the art will moreover note that the number of cycles shown in FIG. 4 represent a minimum contention case for the bus 212 of FIG. 2. If other transactions are initiated by other master devices 208 during cycles 1 through 24, then the bus arbitrator 202, to provide fair access to the bus 212, would most likely rotate its grant to the other transactions.

Now referring to FIG. 5, a timing diagram 500 is presented illustrating a 32-byte data transfer to SLAVE DEVICE 3 218 over the 64-bit bus 212 of FIG. 2. The timing diagram 500 shows relative states during the 32-byte data transfer of a bus clock signal 501, CLOCK; a bus request signal 502, REQ#; a bus grant signal 503, GNT#; and 64 data bit signals 504, DATA. SLAVE 3 218 is a 64-bit device that supports full-width transactions, however, it only supports a 2-cycle burst length rather than a 4-cycle burst length. In a present day system, SLAVE 3 218 is representative of a low-end performance device that is employed to perform a special-purpose function that is unique to the system application. SLAVE 3 218 is capable of bursting, but not at the fixed burst length prescribed for the bus 212 under discussion. And because a present day bus master 208 assumes that all devices connected to the bus is capable of accepting all maximum allowable bursts, the master will try sending the 32 bytes to the slave device 3 218 using a 4 cycle burst of 64-bits each. Hence, the designer must redesign the interface of slave device 3 218 to accept this lowest length or build in a retry signal 505 that is sent after the $2^{nd}$ cycle of the burst transaction. This indicates to the master that only 2 cycles of the burst were successfully accepted. The master must then re-send the $3^{rd}$ & $4^{th}$ cycle data as a separate transaction. This whole procedure is complex and wastes valuable bus cycles. The relative signal states 501–505 for the 32-byte transaction are shown with respect to cycles of CLOCK 501.

During cycles 3–6, a burst of 4 cycles is attempted to transfer 32-bytes of data between the bus master 208 and the slave 3 218. However, at cycles 6–7 the slave 3 218 issues a retry signal 505 indicating that it could not receive the last 2 cycles of the burst. The bus master 208 is therefore required to retransmit these last two eight-byte quantities, which it does in clock cycles 9–10. Thus, to transfer 32-bytes of data over a 64-bit bus, to the slave 3 218 required two bursts, a retry signal 505, and 7 clock cycles (3–10).

The examples discussed with reference to FIGS. 1 through 5 highlight the deficiencies inherent in present day bus protocols used to transfer data over a system interface bus. With rare exception, a bus master provides the capability to either execute a burst transaction, a single transaction, or re-send unaccepted data until all of it is accepted by the slave. The Pentium® bus is one example of the type of limitations that exist in present day system buses. It provides the capability to perform a single-cycle transaction, a 2-cycle burst transaction, or a 4-cycle burst transaction, but the burst transactions are restricted to be 64-bits/cycle transfers, 64 bits being the full width of the system bus. Hence, to participate in a burst transaction over the Pentium II® system bus, a device must have a 64-bit data path and be able to achieve either a 2-cycle burst length or a 4-cycle burst length; 32-bit, 16-bit, and 8-bit devices are relegated to single-cycle transfers as well as 64-bit devices that cannot achieve the state burst lengths.

Advances in bus technologies will continue to promote bus width migration from 32-bit data buses, to 64-bit data buses, to 128-bit data buses, and beyond. In conjunction with this evolution, the number of cycles per burst that devices must support will have to increase as well. But the future scenario is merely the present scenario intensified: communications with legacy and low-end devices will consume excessive amounts of valuable bus bandwidth. And this is why current data bus architectures and associated bus master apparatus are deficient. Present day bus masters cannot take advantage of legacy and low-end device capabilities to optimize burst transfers over a data bus. And the ensuing all-or-nothing data transfer environment results in clogged buses wherein it is probable that certain devices-those requiring a low-latency response for example-will fail to perform because their request for data is on hold awaiting completion of a number of single-cycle transactions with a less capable device.

The present invention overcomes the problems detailed above by providing an apparatus that allows burst transactions to be optimized according to the capabilities of a specific target device, thus more efficiently utilizing bus resources and freeing up bus bandwidth. The present invention is more completely described with reference to FIGS. 6 through 9.

Figure 6:
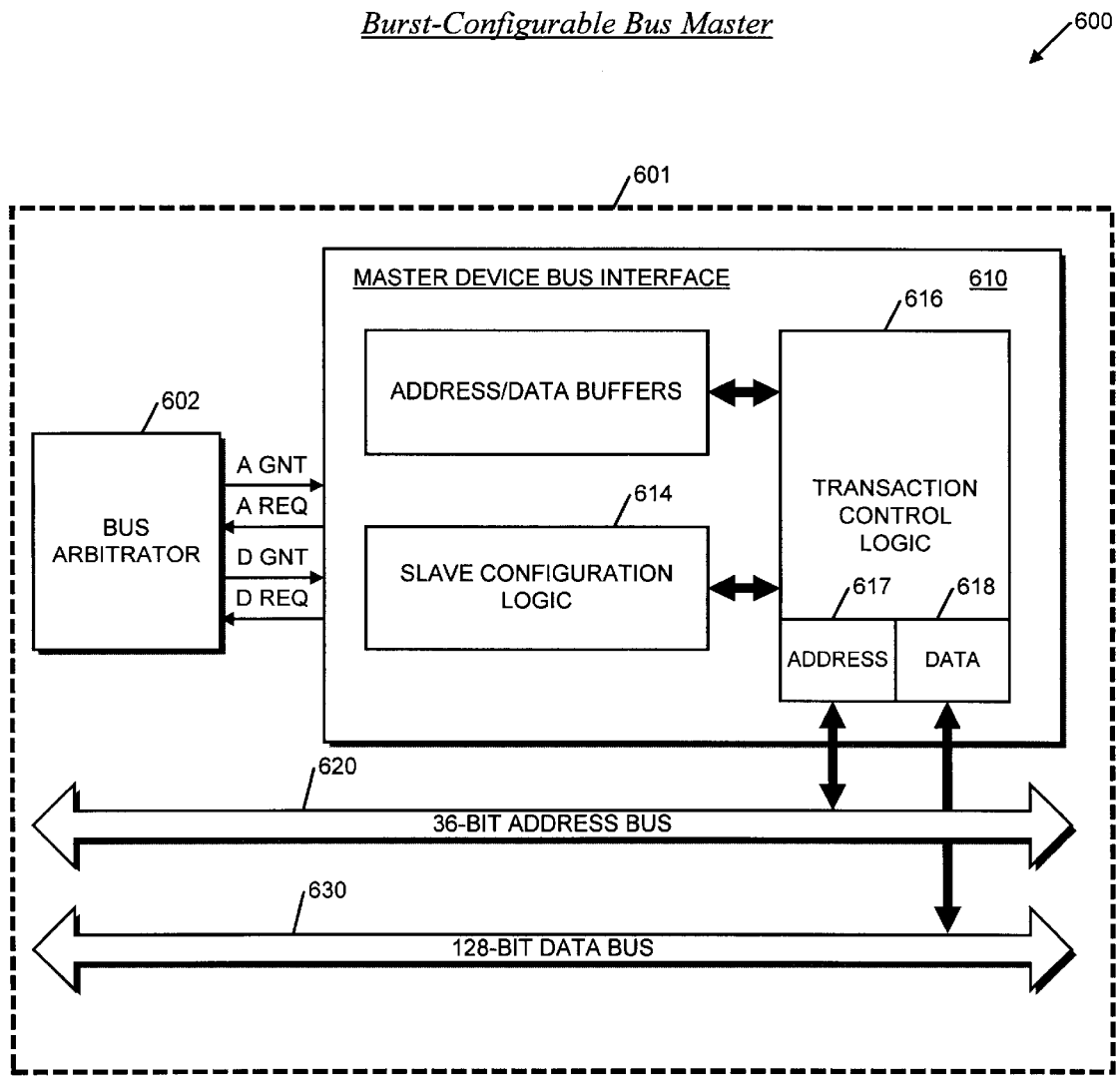
FIG. 6 is a block diagram illustrating a burst-configurable bus master according to the present invention.

Referring to FIG. 6, a block diagram 600 is presented illustrating a burst-configurable bus master 610 according to the present invention that controls transactions over an on-chip address bus 620 and an on-chip data bus 630. A bus arbitrator 602 is also shown as part of an integrated circuit device 610 upon which the bus master 610, address bus 620, and data bus 630 are fabricated. In the preferred embodiment, the burst-configurable bus master 610 is shown connected to separate data 630 and address 620 buses, the address bus 620 being a 36-bit bus and the data bus 630 being a 128-bit system data bus 620. By configuring the address bus 620 and data bus 630 separately, the present invention allows address transactions over the address bus 620 to be de-coupled, or split, from data transactions over the data bus 630. The burst-configurable bus master 610 has address/data buffers 612 and slave configuration logic 614, both of which are connected to transaction control logic 616. The transaction control logic 616 consists of separate address logic 617 and data logic 618, thus enabling transaction requests and related activities to be pipelined over the different buses 620, 630, i.e., several address transactions can occur over the address bus 620 while several data transactions are being executed over the data bus 630. The master device bus interface 610 can be embodied as a CPU, a graphics processor, a DSP, or any other device that is capable of initiating a transaction over the buses 620, 630. In an alternative embodiment, both the bus master 610 and the buses 620, 630 reside on separate integrated circuits. In another alternative embodiment, the address bus 620 and the data bus 630 are multiplexed over a set of common signals.

The address and data buses 620, 630 operate similar to the buses 112, 212 described with reference to FIGS. 1 and 2 respectively, the primary difference being that the buses 620, 630 according to the present invention support a variable burst length. In one embodiment, the data bus 630 according to the present invention is 128 bits wide. In an alternative embodiment, the data bus 630 is 64-bits wide. In yet another embodiment, the data bus 630 is 32-bits wide. In yet another embodiment, a portion of the data bus 630 may interface to an on-chip DRAM. In this instance, up to 4k data lines may be run between master devices and the on chip DRAM. Hereinafter, discussion will be restricted to the 128-bit wide embodiment.

Operation of the bus master 610 revolves around interaction between the slave configuration logic 614 and the transaction control logic 616. When the bus master 610 is required to initiate a data transaction, buffer logic (not shown) loads the address/data buffers 612 with the address of a target slave device and, in the case of a write transaction, the data to be transferred. For read transactions, the data read from the target slave device is received into the address/data buffers 612. However, prior to initiating the transaction, the address, or identifier, of the target slave device is provided to the slave configuration logic 614 by the transaction control logic 616. The slave configuration logic 614 stores the capabilities associated with a burst transaction for each device that is connected to the bus 620. That is, the maximum burst length and maximum data width accepted by every slave device. Thus, the slave configuration logic 614, in turn, provides the transaction control logic 616 with a transaction capability corresponding to the target slave device. The transaction control logic 616 uses the provided transaction capability to configure the transaction for optimum bus efficiency by adjusting the number of cycles in a burst transaction along with the number of data bits transferred within each cycle of the burst.

Following optimization of the transaction, the bus master 610 issues an address bus request to the bus arbitrator 602 for a burst transaction consisting of the optimized number of cycles. In the preferred embodiment, the number of cycles in a burst is variable from one cycle up through and including 16 cycles. After the address bus 620 is granted to the bus master 610, the address portion of the transaction is sent by the address logic 617 over the address bus 620 to the target device. Following this, the bus master 610 issues a data bus request to the bus arbitrator 602. After the data bus 630 is granted to the bus master 610, the data logic 618 executes the optimized burst transaction thus efficiently transferring the data to the target device over the data bus 630. Rather than relegating legacy and low-end devices to a series of single-cycle transactions, the bus master 610 according to the present invention provides a configurable burst length and width so that overhead cycles on both buses 620, 630 are minimized.

Now referring to FIG. 7, a block diagram 700 is presented illustrating slave configuration logic 710 within a bus master according to the present invention. The slave configuration logic 710 has two slave configuration registers 711, 712 that together hold the burst transaction capabilities for all slave devices on the bus.

In one embodiment, register 711 holds the maximum burst length capability of each slave device in 7 fields within the register. One field for each slave device is 4-bits wide, encoding a maximum of 16 cycles possible. One register 711 is therefore 28 bits wide. It should be appreciated that other maximum burst lengths are possible and can be thus encoded. Also, more or less numbers of slave devices can be encoded.

Register 712 holds the maximum burst width capability of each slave device in 7 fields within the register. One field for each slave device is 4-bits wide, encoding a maximum of 128 bits (16-bytes) possible. It should be appreciated that other maximum burst widths are possible and can be thus encoded.

In operation, prior to initiating a transaction, transaction control logic (not shown) according to the present invention provides a device id to the array access logic 714. In the embodiment described above, the slave device id is used to check the appropriate bits in registers 711, 712 that correspond to that device. The corresponding maximum burst length and maximum burst width values are extracted and returned to the transaction control logic. This transaction control logic then uses this information to tailor the transfers to that device and optimize the transfer.

Since a bus master according to the present invention can vary the number of cycles in a burst and can also perform burst transactions with devices having data paths less than the full width of the bus, the number of single-cycle transactions over the bus are minimized. By minimizing the number of single-cycle transactions over the bus, the number of transaction overhead cycles, that is, cycles associated with requesting and granting the bus, are minimized as well. As a result, the efficiency of the bus is increased through use of the present invention; clock cycles are used to perform required data transfers rather than being devoted to repetitious arbitration cycles. Two instructive examples of how use of the present invention improves system performance are now discussed with reference to FIGS. 8 and 9.

Figure 8:
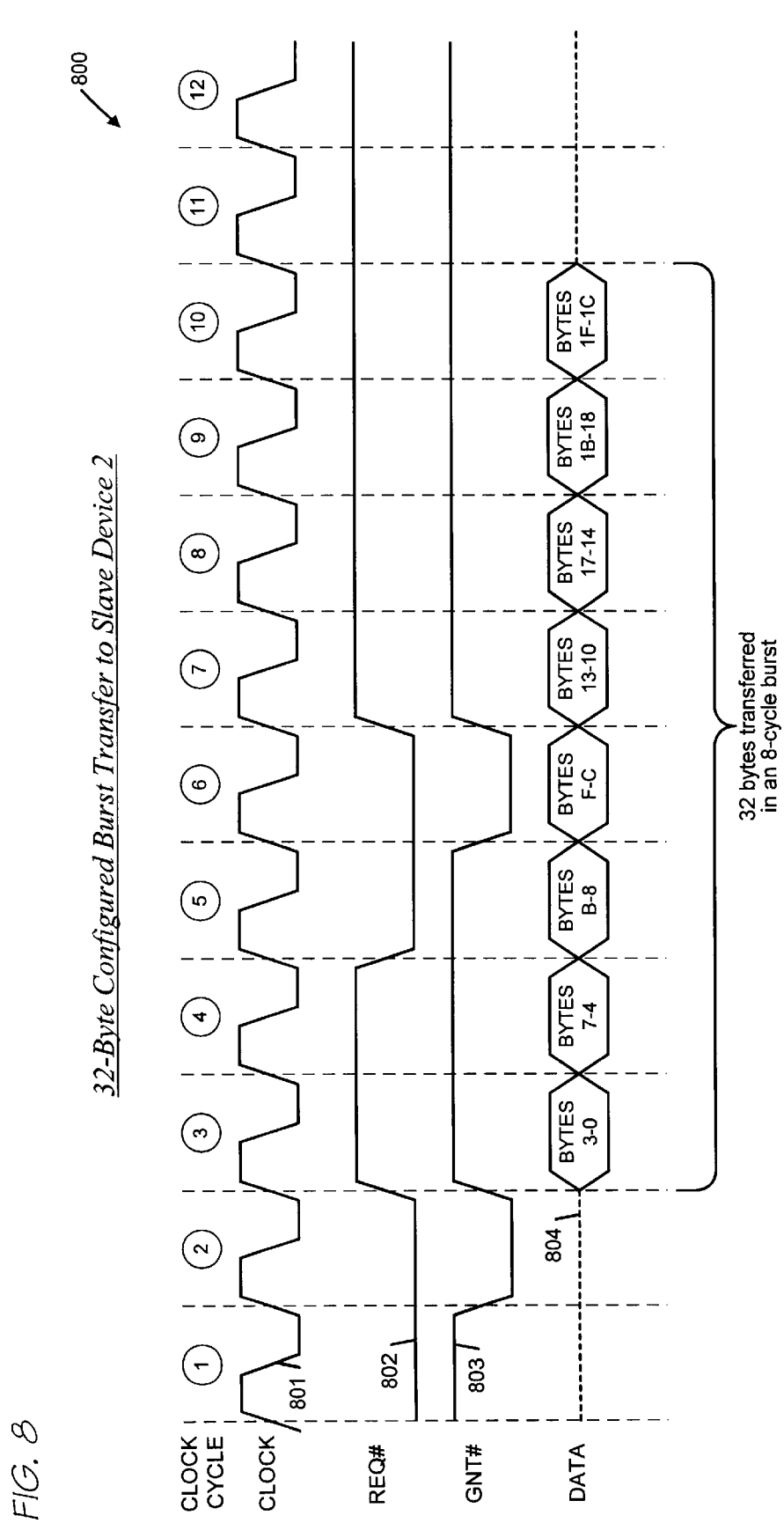
FIG. 8 is a timing diagram illustrating a 32-byte data transfer to SLAVE DEVICE 2 over a burst-configurable data bus according to the present invention.

Referring to FIG. 8, a timing diagram 800 is presented illustrating a 32-byte data transfer to SLAVE DEVICE 2 216 of FIG. 2 when this device 216 is interconnected over a burst-configurable data bus to a bus master according to the present invention. Recall that SLAVE DEVICE 2 216 is a 32-bit device that is capable of supporting burst transactions. Whereas employment of SLAVE DEVICE 2 216 in a conventional data bus 212 as illustrated in FIG. 4 resulted in a series of eight single-cycle transactions, employment of the device 216 in a system configuration according to the present invention allows the 32-bytes to be transferred in an optimized burst. The timing diagram 800 shows relative states during the 32-byte data transfer of a bus clock signal 801, CLOCK; a bus request signal 802, REQ#; a bus grant signal 803, GNT#; and 128 data bit signals 804, DATA. The relative signal states 801–804 for the 32-byte transaction are shown with respect to cycles of CLOCK 801.

Prior to initiating the transaction, transaction control logic in the bus master ascertains the capability of SLAVE DEVICE 2 216 by selecting contents of a slave configuration register corresponding to SLAVE DEVICE 2 216. The contents indicate that the SLAVE DEVICE 2 216 is a 32-bit device that can support a maximum burst length of 16 cycles. Hence, the transaction control logic configures the transaction as an 8-cycle, 32-bits/cycle, burst.

During cycle 1, REQ# 802 is asserted by the burst-configurable bus master requesting an 8-cycle burst transaction with SLAVE 2 216 to transfer 32 bits of data during each cycle.

During cycle 2, a bus arbitrator grants the bus to the bus master for the burst transaction by asserting GNT# 803.

During the next eight clock cycles, cycles 3 through 10, the bus master transfers four bytes of data per cycle over DATA 304 to SLAVE 2 216. At this point, the 32-byte burst transaction is completed. Ten clock cycles are required to transfer the 32 bytes of data to SLAVE DEVICE 2 with only two cycles being consumed with transaction overhead. This is in contrast to the 24 cycles required for transfer of the data by a conventional bus master. The result is over a 58 percent improvement in bus efficiency.

Figure 9:
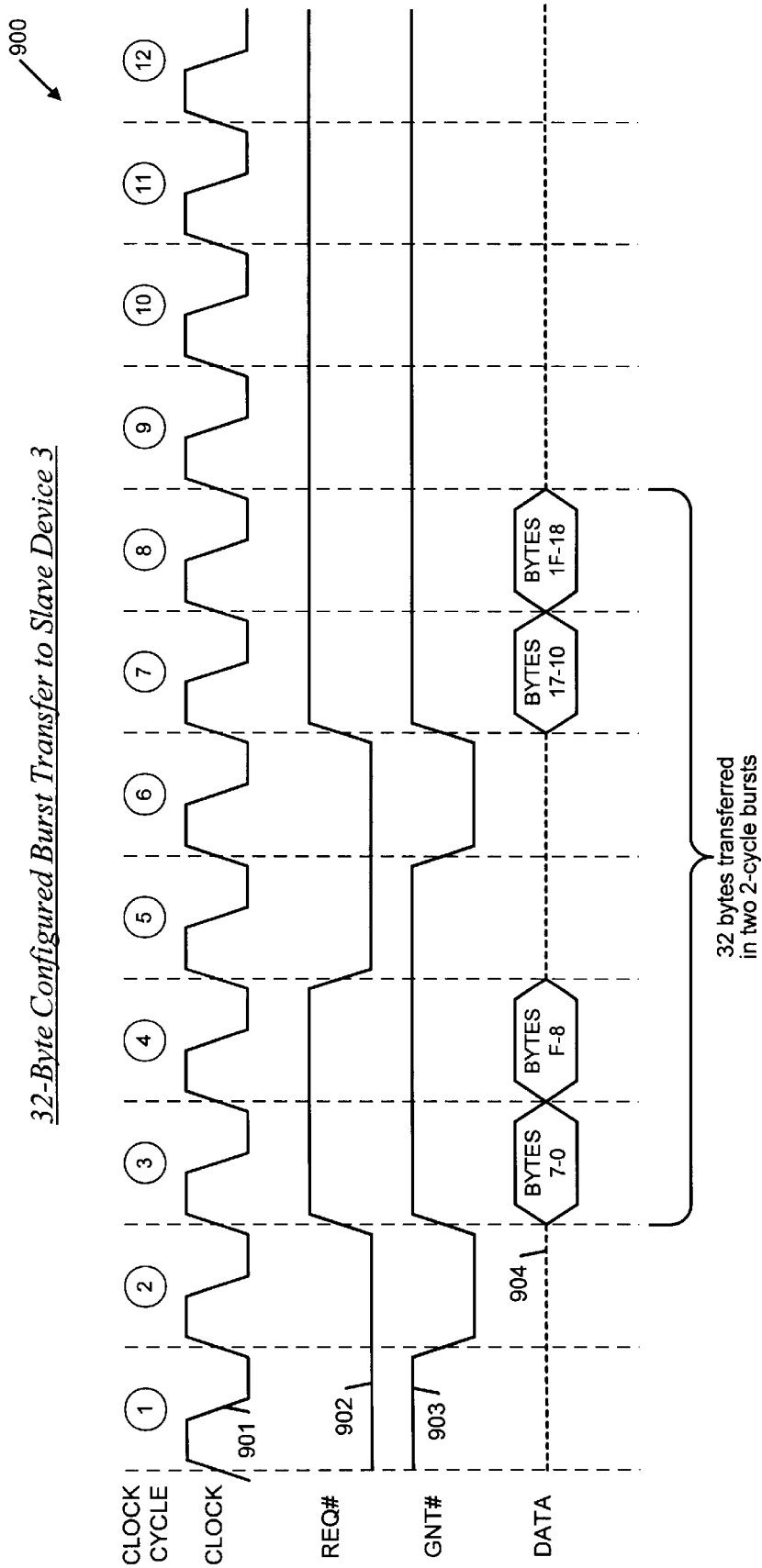
FIG. 9 is a timing diagram illustrating a 32-byte data transfer to SLAVE DEVICE 3 over a burst-configurable data bus according to the present invention.

Now referring to FIG. 9, a timing diagram 900 is presented illustrating a 32-byte data transfer to SLAVE DEVICE 3 218 of FIG. 2 as this device 218 is interconnected over the burst-configurable data bus to a bus master according to the present invention. Recall that SLAVE DEVICE 3 218 is a 64-bit device that is capable of supporting 2-cycle burst transactions. And whereas employment of SLAVE DEVICE 3 218 in a conventional data bus 212 as illustrated in FIG. 5 results in retries and wasted bus cycles, employment of the device 218 in a system configuration according to the present invention allows the 32-bytes to be transferred in an optimized sequence of two 2-cycle bursts. The timing diagram 900 shows relative states during the 32-byte data transfer of a bus clock signal 901, CLOCK; a bus request signal 902, REQ#; a bus grant signal 903, GNT#; and 128 data bit signals 904, DATA. The relative signal states 901–904 for the 32-byte transaction are shown with respect to cycles of CLOCK 901.

Prior to initiating the transaction, transaction control logic in the bus master ascertains the capability of SLAVE DEVICE 3 218 by selecting contents of a slave configuration register corresponding to SLAVE DEVICE 3 218. The contents indicate that the SLAVE DEVICE 3 218 is a 32-bit device that can support a maximum burst length of two cycles. Hence, the transaction control logic configures the transaction as a sequence of two 2-cycle bursts, each cycle transferring 64 bits of data.

During cycle 1, REQ# 902 is asserted by the burst-configurable bus master requesting a 2-cycle burst transaction with SLAVE 3 218 to transfer 64 bits of data during each cycle.

During cycle 2, a bus arbitrator grants the bus to the bus master for the burst transaction by asserting GNT# 903.

During the next two clock cycles, cycles 3 and 4, the bus master and SLAVE 3 218 transfer a quadword of data per cycle over DATA 904. At this point, the first 2-cycle burst is completed.

During cycle 5, REQ# 902 is again asserted by the burst-configurable bus master requesting a second 2-cycle burst transaction with SLAVE 3 218 to transfer 64 bits of data during each cycle.

During cycle 6, a bus arbitrator grants the bus to the bus master for the burst transaction by asserting GNT# 903.

During the next two clock cycles, cycles 7 and 8, the bus master and SLAVE 3 218 transfer a quadword of data per cycle over DATA 904. At this point, the 32-byte transaction is completed.

Eight clock cycles are required to transfer the 32 bytes of data to SLAVE DEVICE 3 with only four cycles being consumed with transaction overhead. This is in contrast to the 12 cycles required for transfer of the data by a conventional bus master. The result is a 33 percent improvement in bus efficiency.

The examples discussed with reference to FIGS. 6 through 9 clearly demonstrate that the present invention brings significant performance improvement to bus-interconnected computer system configurations, particularly in the presence of legacy or low-end performance devices. By providing an apparatus whereby burst transactions can be tailored specifically to the characteristics of a given target device, data traffic over the bus is maximized in proportion to control traffic, resulting in the elimination of unnecessary bus overhead and precluding pointless contentions for the bus between devices.

In addition to implementations of the invention using hardware, the invention can also be embodied in an article of manufacture comprised of a computer usable medium configured to store a computer-readable program code. The program code causes the enablement of the functions or fabrication, or both, of the hardware disclosed in this specification. For example, this might be accomplished through the use of general programming languages (e.g., C, C++, and so on), hardware description language (HDL), register transfer languages (RTL), Verilog HDL, VHDL, AHDL (Altera Hardware Description Language), or other programming and/or circuit (i.e., schematic) capture tools available in the art. A book entitled "A Verilog HDL Primer" by J. Bhasker, Star Galaxy Pr., 1997 provides greater detail on Verilog HDL, and is incorporated herein by reference in its entirety for all purposes.

It is understood that the functions accomplished by the invention as described above could be represented in a core which could be utilized in programming code and transformed to hardware as part of the production of integrated circuits. Also, other implementations of the invention using a combination of hardware and software are also possible. Therefore, the embodiments expressed above are within the scope of the invention and should also be considered protected by this patent.

In addition, the present invention has been particularly characterized in terms of a maximum number of cycles in a burst set at 16. This maximum burst length is illustrative because it is proportionate to the capabilities of present day devices that are connected to a computer bus, the typical present day computer bus being 64-bits wide and consisting of approximately eight devices. But prescription of these parameters herein in no way restricts application of the present invention to computer systems having different bus specifications to include variations in bus width, address/data bus configuration, the number of devices on the bus, and arbitration scheme. The present invention can provide performance improvements to a 16-bit data bus as well as to a 128-bit data bus.

Furthermore, the present invention has been described in terms of a bus master apparatus that is the primary bus interface for an element of a computer system configuration. This element can be embodied as a CPU, graphics processor, or DSP, as noted above, however, it should not be construed that these examples preclude the employment of the present invention in other, less commonly known components to include communications processors, reduced instruction set computers (RISC), video processors, memory controllers, and microcontrollers.

Moreover, present day integrated circuit technology allows the incorporation of a system bus along with a few associated master and slave devices to be fabricated on the same integrated circuit. Future advances in integrated circuit design and fabrication technologies may provide the capability to completely incorporate a system bus along with all of its connected devices within the same integrated circuit. The present invention comprehends such improvements. It is entirely within the scope of the present invention to provide configurability of burst transactions over a data bus, regardless of the embodiment of the bus, be it on-chip or off-chip.

Finally, those skilled in the art should appreciate that they can readily use the disclosed conception and specific embodiments as a basis for designing or modifying other structures for carrying out the same purposes of the present invention without departing from the spirit and scope of the invention as defined by the appended claims.

What is claimed is:

1. A bus master for controlling transactions to a slave device over a data bus, the bus master comprising:
    slave configuration logic, configured to store a burst transaction capability corresponding to the slave device; and
    transaction control logic, coupled to said slave configuration logic, configured to vary burst width according to said burst transaction capability.

2. The bus master as recited in claim 1, wherein said transaction control logic varies burst length according to said burst transaction capability.

3. The bus master as recited in claim 2, wherein the bus master is embodied within a central processing unit (CPU), said CPU being connected to the data bus.

4. The bus master as recited in claim 1, wherein said slave configuration logic stores a plurality of burst transaction capabilities, each of said plurality of burst transaction capabilities corresponding to each of a plurality of devices connected to the data bus.

5. The bus master as recited in claim 4, wherein said slave configuration logic comprises a plurality of registers.

6. The bus master as recited in claim 5, wherein fields within said registers comprise:
    a burst length field, for storing a number of cycles per burst that an associated one of said plurality of devices is capable of accomplishing; and
    a width field, coupled to said burst length field, for storing a number of data bits per cycle that said associated one of said plurality of devices is capable of accomplishing.

7. The bus master as recited in claim 6, wherein said transaction control logic can vary said burst length from one cycle per burst up through and including 16 cycles per burst.

8. The bus master as recited in claim 6, wherein the full width of the data bus comprises 32-bits, 64-bits, 128-bits, or for embedded DRAM the bit width of the DRAM.

9. The bus master as recited in claim 8, wherein said transaction control logic provides more than one cycle per burst to transfer data to/from said associated one of said plurality of devices when the width of said associated one of said plurality of devices is less than the full width of the data bus.

10. A bus master apparatus for controlling data transactions to a slave device, the bus master apparatus comprising:
    a data bus, configured to provide a medium for affecting a transaction between a bus master device and the slave device, wherein said bus master device and said data bus are incorporated into a single integrated circuit;
    slave configuration logic, coupled within said single integrated circuit to said data bus, configured to store a burst transaction capability corresponding to the slave device; and
    transaction control logic, coupled within said single integrated circuit to said slave configuration logic, configured to vary burst width according to said burst transaction capability.

11. The bus master apparatus as recited in claim 10, wherein said transaction control logic varies burst length according to said burst transaction capability.

12. The bus master apparatus as recited in claim 11, wherein said slave configuration logic stores a plurality of burst transaction capabilities, each of said plurality of burst transaction capabilities corresponding to each of a plurality of devices connected to said data bus.

13. The bus master apparatus as recited in claim 12, wherein said slave configuration logic comprises a plurality of registers.

14. The bus master apparatus as recited in claim 13, wherein each of said registers comprises:
    a burst length field, for storing a number of cycles per burst that an associated one of said plurality of devices is capable of accomplishing; and
    a width field, coupled to said burst length field, for storing a number of data bits per cycle that said associated one of said plurality of devices is capable of accomplishing.

15. The bus master apparatus as recited in claim 14, wherein said transaction control logic can vary said burst length from one cycle per burst up through and including 16 cycles per burst.

16. The bus master apparatus as recited in claim 15, wherein the full width of said data bus comprises 32-bits, 64-bits, 128-bits, or for embedded DRAM the bit width of the DRAM.

17. An apparatus within a bus interface for controlling a data transfer to/from a slave device over a data bus, the apparatus comprising:
    transaction configuration logic, for providing a transaction capability for the slave device to the bus interface, said transaction configuration logic comprising:
        a configuration register, for storing said transaction capability for the slave device; and
        access logic, coupled to said configuration register, for retrieving said transaction capability from said configuration register; and
    transaction control logic, coupled to said transaction configuration logic, for configuring the data transfer to the slave device according to said transaction capability by adjusting number of data bits transferred per cycle.

18. The apparatus as recited in claim 17, wherein said transaction control logic configures the data transfer according to said transaction capability by varying number of cycles per burst.

19. The apparatus as recited in claim 18, wherein said configuration register comprises:
    a burst length field, for storing a cycles/burst capability; and
    a burst width field, coupled to said burst length field, for storing a number of data bits/cycle capability.

20. The apparatus as recited in claim 19, wherein said transaction control logic varies said number of cycles per burst from one cycle per burst up through and including 16 cycles per burst.

21. The apparatus as recited in claim 20, wherein said transaction control logic provides more than one cycle per burst to transfer data to/from the slave device when said data bits/cycle capability is less than the width of the data bus.

22. A computer program product for use with a computing device, the computer program product comprising:
- a computer usable medium having computer readable program code embodied in said medium for causing an on-chip computing bus to be developed, said computer readable program code comprising:
  - first instructions, for causing said computing device to describe a plurality of slave configuration registers within an integrated bus master device, wherein each of said plurality of slave configuration registers stores a transaction capability for a corresponding slave device connected to a data bus; and
  - second instructions, for causing the computing device to describe transaction control logic, wherein, for a data transfer to a given slave device, said transaction control logic configures data bits/cycle in accordance with a given transaction capability retrieved from a given slave configuration register.

23. The computer program product as recited in claim 22, wherein said transaction control logic configures cycles/burst in accordance with said given transaction capability.

24. The computer program product as recited in claim 23, wherein the computing device describes two slave configuration registers.

25. The computer program product as recited in claim 24, wherein said slave configuration registers comprise:
- a burst length field, for storing a number of cycles per burst that a given slave device is capable of accomplishing; and
- a width field, coupled to said burst length field, for storing a number of data bits per cycle that said given slave device is capable of accomplishing.

26. The computer program product as recited in claim 25, wherein said transaction control logic can vary the number of said cycles/burst from one cycle/burst up through and including 16 cycles/burst, with an increment of one cycle/burst.

27. The computer program product as recited in claim 26, wherein the full width of said data bus is 32-bits, 64-bits, or 128-bits.

28. The computer program product as recited in claim 27, wherein said transaction control logic provides more than one cycle/burst to transfer data to/from said given slave device when the width of said given slave device is less than the full width of said data bus.

29. A method for controlling conveyance of data to a device over a data bus, the method comprising:
- storing a burst transaction capability corresponding to the device;
- reading said burst transaction capability; and
- varying burst width of data conveyed to the device over the data bus according to said burst transaction capability.

30. The method, as recited in claim 29 wherein the burst width in said step of varying comprises:
- 8-bit;
- 16-bit;
- 32-bit; or
- 64-bit bursts.

31. The method as recited in claim 29 wherein the burst transaction capability defines a burst width that can be accepted by the device.

* * * * *